(12) United States Patent
Asiri

(10) Patent No.: US 11,343,251 B2
(45) Date of Patent: May 24, 2022

(54) SECURE AUTHORIZATION PROVISIONING USING VARIANT PROFILES

(71) Applicant: Saudi Arabian Oil Company, Dhahran (SA)

(72) Inventor: Abdulrahman Asiri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 319 days.

(21) Appl. No.: 16/426,912

(22) Filed: May 30, 2019

(65) Prior Publication Data
US 2020/0382508 A1   Dec. 3, 2020

(51) Int. Cl.
*H04L 9/40* (2022.01)
*H04L 67/306* (2022.01)
*H04L 29/06* (2006.01)

(52) U.S. Cl.
CPC ............ *H04L 63/101* (2013.01); *H04L 63/20* (2013.01); *H04L 67/306* (2013.01)

(58) Field of Classification Search
CPC ..... H04L 63/101; H04L 63/20; H04L 67/306; H04L 63/102; G06F 21/604
See application file for complete search history.

(56) References Cited

U.S. PATENT DOCUMENTS

| | | | |
|---|---|---|---|
| 5,911,143 A * | 6/1999 | Deinhart | G06F 21/6218 707/999.009 |
| 6,950,825 B2 | 9/2005 | Chang et al. | |
| 7,653,936 B2 | 1/2010 | Oberst | |
| 7,991,764 B2 * | 8/2011 | Rathod | G06Q 20/322 707/713 |
| 8,887,241 B2 | 11/2014 | Britton et al. | |
| 9,467,472 B2 * | 10/2016 | Weiner | H04L 63/20 |
| 10,013,411 B2 * | 7/2018 | Sherry | G06F 40/174 |
| 2004/0015778 A1 * | 1/2004 | Britton | G06F 40/103 715/205 |
| 2006/0122967 A1 * | 6/2006 | Purkayastha | H04L 67/04 |

(Continued)

OTHER PUBLICATIONS

PCT International Search Report and Written Opinion in International Appln. No. PCT/US2020/034816, dated Sep. 7, 2020, 15 pages.

(Continued)

*Primary Examiner* — Abiy Getachew
(74) *Attorney, Agent, or Firm* — Fish & Richardson P.C.

(57) ABSTRACT

Systems and methods include a computer-implemented method for using variant profiles, including the following. A composite profile for a user is generated by a variant profile system. The composite profile defines resource authorizations for the user. At least one sub-profile is generated for the user. Each sub-profile includes at least one role-based authorization for a user role, and each role-based authorization is extended to users having a composite profile that includes the sub-profile. A set of variant fields for each sub-profile is received from an administrator. The set of variant fields identifies user-specific fields to which the user has access under the user role. The at least one sub-profile is linked to the composite profile of the user. A user buffer defining authorizations for the user is updated using the composite profile of the user, causing the authorizations to become active.

20 Claims, 15 Drawing Sheets

(56) References Cited

U.S. PATENT DOCUMENTS

2008/0288588 A1\* 11/2008 Andam ................ G06F 16/957
                                                              709/204
2009/0205018 A1\*  8/2009 Ferraiolo ............ G06F 21/6218
                                                              726/1
2010/0162389 A1\*  6/2010 Burger ................ G06F 21/6218
                                                              726/21

OTHER PUBLICATIONS

Georgiadis et al., "Flexible team-based access control using contexts," Proceedings of the Sixth ACM Symposium on Access Control Models and Technologies, New York, NY, May 3, 2001, 7 pages.

GCC Examination Report in GCC Appln. No. GC 2020-39839, dated Sep. 14, 2021, 3 pages.

\* cited by examiner

FIG. 6A

Role Assignment

Requestor Information

| | |
|---|---|
| Name: Firstname Lastname | To submit on behalf of another Employee enter NetworkID or Badge # below |
| Position: Pharmacist II | |
| Organization: INTRAVENOUS ADMIXTURE SVCS(30022479) | NetworkID/ Badge #: 602    [Change Info] |
| Cost Center: 100122 | |

Select System

- ○ PEB [Enterprise Buyer]
- ○ PRH [Human Resources]
- ○ PRW [Business Intelligence]
- ○ PAI [Auto ID & Event Management]
- ○ PMA [Marine System]
- ○ PPO [Adv. Planning Optimizer]
- ○ PRM [Health Care]
- ○ PSM [Solution Manager]
- ○ PSC [Supply Network Collaboration]
- ○ PNG [NetWeaver Gateway]
- ○ PRA [Aviation]
- ○ PRO [Hydrocarbon Mgmt]
- ○ PPI [Prod. Process Integration]
- ○ PBC [Plan & Consolidation Pro]
- ⦿ PRC [Finance & Logistics]
- ○ PRR [E-Recruiting]
- ○ PCR [Cust. Relations Mgmt]
- ○ PGR [SAP Governance, Risk & Compliance]

Select Role(s)

⦿ Role Name
○ Transaction

FICO:PFAD:08:00

[Search]

OR

[List All Proposals]

Select Role and click on "Add"

Click on the Role Name for more details

| | Role | 606 | Role Description 604 | Proponent |
|---|---|---|---|---|
| 🗐 | | FICO:PFAD:08:0000 | Cost Sheet Reporting (Base Role) | ACCOUNTING POLICIES & SYSTEMS DEPARTMENT - CSL D |
| | | FICO:PFAD:08:0000 | Cost Sheet Reporting (Base Role) | AUTOMATIC PROPONENT |

[Add]

FROM FIG. 6A

Selected Roles

Role(s) in RED require additional data. For each role; click on the box on the left of the role name to activate appropriate input fields

| | Role | Start Date | End Date |
|---|---|---|---|
| 🗎 | FICO:PFAD:08:0000 | 4/8/2020 | 4/7/2021 |

The Maximum for role assignment is one year, or your assignment end date

[ Remove Role ]

Variant Access

Enter required values

Cost Center / CC Group
[ 30000058  608  🔍 ]  [ Add ]

Selected Variant Values

| | Role | Variant Value | Value Type | Value Description | Inclusive | Start Date | End Date |
|---|---|---|---|---|---|---|---|
| 🗎 | FICO:PFAD:08:0000 | 300000056 | CG | 18 WORK ORDER PLANNING & MATERIALS UNIT | ☐ | 4/8/2020 | 4/7/2021 |

[ Remove Variant ]

SECURE AUTHORIZATION PROVISIONING USING VARIANT PROFILES

BACKGROUND

The present disclosure applies to providing user authorizations. The ubiquity of an organization's data systems and the abundance of diverse managed resources typically requires secure access control methods to enable effective and efficient operations. In some conventional systems, organizations rely on role-based authorization methods to manage users, provide services, and assign privileges. Roles and combinations of roles can be used as the primary method for user authorization and admission control in enterprise resources management (ERP) systems.

Coarse-grained authorizations, such as role-based access control (RBAC) systems may work well for a small organization having a small number of resources, but RBAC systems can become problematic for larger organizations that may have thousands of users and resources. Specifically, the increasing number of different real-world roles, often with very minor differences between some of the roles, can require that a large number of roles are defined in order to capture the permissions needed to express all access control scenarios. As a result, the RBAC system may include many roles that have been created for specific purposes (for example, plant vs. warehouse) and specific users (for example, supervisor vs. employee). Moreover, employee changes and turnover rates in larger organizations can complicate the management of large numbers of roles. Further, the RBAC model may not enable refined access control at an object level as opposed to a role-level (for example, authorization for a specific department cost center). As a result, the RBAC model does not scale efficiently as the number of managed resources permissions increases.

RBAC systems can provide coarse-grained admission control. This control is acceptable when a limited set of potential users and resources are to be managed. However, this approach typically does not scale to enterprise environments that include thousands of users and resources. Specifically, organizations may not be able to efficiently create and manage the number of roles necessary to provide adequate access control to their resources. Furthermore, provisioning roles to users in a dynamic environment, where users join, transfer within, and leave departments, for example, can result in significant overhead and costs for an information technology (IT) organization.

SUMMARY

The present disclosure describes techniques that can be used for using variant profiles to define and manage user authorizations. In some implementations, techniques using variant profiles can be used to minimize the number of authorization roles needed for an organization. Variant profiles can be used to differentiate users' access, providing a fine-grained authorization needed with the least number of different roles. This use of variant profiles can eliminate the need for large numbers (for example, thousands) of authorization roles, while maintaining the same level of security and flexibility for the organization.

In some implementations, a computer-implemented method includes the following. A composite profile for a user is generated by a variant profile system. The composite profile defines resource authorizations for the user. At least one sub-profile is generated by the variant profile system for the user. Each sub-profile includes at least one role-based authorization for a user role, and each role-based authorization is extended to users having a composite profile that includes the sub-profile. A set of variant fields for each sub-profile is received by the variant profile system from an administrator. The set of variant fields identifies user-specific fields to which the user has access under the user role. The at least one sub-profile is linked by the variant profile system to the composite profile of the user. A user buffer defining authorizations for the user is updated by the variant profile system using the composite profile of the user, causing the authorizations to become active.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method or the instructions stored on the non-transitory, computer-readable medium.

The subject matter described in this specification can be implemented in particular implementations, so as to realize one or more of the following advantages. First, the use of variant roles can reduce the complexity and time needed in large organizations to manage user authorizations that would otherwise require separate authorizations for thousands of users and resources. Second, the use of variant roles can ensure that users have the authorizations they need and nothing more. For example, by managing access using the variant profiles (with the users' authorization and the authorization objects attached to the those profiles), a company-wide control process can be provided for managing information technology (IT) assets while maintaining a desired level of security in a precise manner.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 6A-6B collectively present a screenshot of an example of a role assignment user interface, according to some implementations of the present disclosure.

FIG. 7 is a screenshot of an example of a user administration tool, according to some implementations of the present disclosure.

FIG. 8 is a screenshot of an example of an authorization assignment tool, according to some implementations of the present disclosure.

Like reference numbers and designations in the various drawings indicate like elements.

DETAILED DESCRIPTION

The following detailed description describes techniques for using variant profiles to define and manage user authorizations. Various modifications, alterations, and permutations of the disclosed implementations can be made and will be readily apparent to those of ordinary skill in the art. The general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, variant profiles can support dynamic fine-grained authorization with composite and sub-composite profiles concepts. Variant profiles can be used instead of creating roles and making a variant for every possible combination of resources. The roles can be used to generate the necessary authorization objects required for accessing the resource. Roles can be defined at a higher abstraction level, for example, starting as a base role. The base role can then be used to create a variant authorization that includes a specific authorization objects type (for example, cost center and plant). The specific authorization object value is also dynamically assigned based on the specific resources authorization (for example, cost center code and plant code).

In some implementations, a variant profile system can be used to set up a per-user composite profile for a user. The composite profile can include multiple sub-profiles linked to the composite profile. Each sub-profile can define a user-specific variant of a role-based authorization, including identifying variant fields to which the user has access. The authorizations can be based on authorization object types (for example, cost center, plant) that are dynamically assigned based on the specific resources authorization (for example, cost center code, plant code). A user buffer can be built for each user to contain all authorizations for the user, and the user buffer can be checked at run-time.

Figure 1:
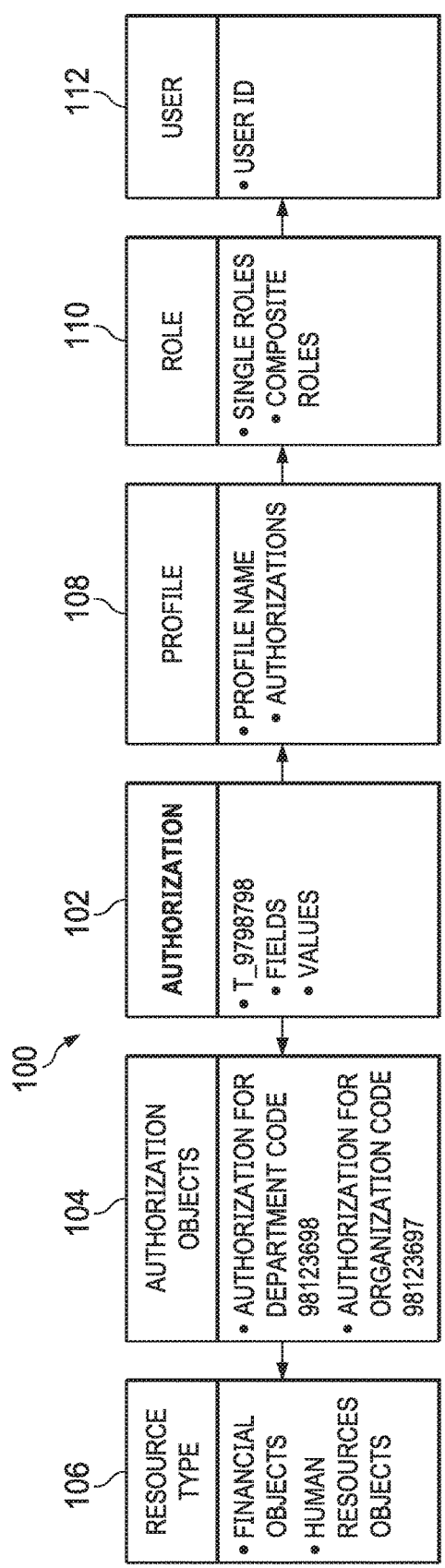
FIG. 1 is a block diagram showing examples of hierarchical relationships among general authorization concept modules, according to some implementations of the present disclosure.

FIG. 1 is a block diagram showing examples of hierarchical relationships 100 among general authorization concept modules, according to some implementations of the present disclosure. An authorization 102 can refer to permissions or the ability to perform activities in system, such as creating objects, displaying objects, or creating reports. An authorization object 104 can refer to a basic element (or building block) that is composed of a grouping of fields. Values of the fields can be used in authorization checks, for example. An authorization field can be a template that allows a value to be linked to an authorization object. The value can be, for example, a number representing a specific department within an enterprise (for example, the Accounting Department) or a specific action (for example, "create" or "change"). Authorization fields can be associated to different resources, such as financial objects and human resource objects, which are different resource types 106. A generated profile 108 can assign various authorization objects according to role requirements based on various custom authorizations, such as a profile that is generated with assigned authorizations. The generated profile can then be added to a role 110 or a user 112. A composite role can be a role that is made by a union of roles 110. A user 112 having a composite role can then possess the authorizations for all the individual roles that make up the composite role. A single role can define a mix of authorizations (or profiles) and transactions that can be performed by a user 112. A composite profile can be used for a user 112 who is assigned two different profiles, essentially providing a composite profile.

In enterprise resource planning (ERP) systems, users are assigned roles that enable the users to perform necessary activities associated with their job functions. Usually, the administration and management of these roles can be performed centrally to integrate various components and organizational systems and to facilitate smooth operations.

Resources can be categorized by resource type 106, and objects can be divided into classes for clarity. An object class can correspond to an application, for example, such as a financial application or a human resources (HR) application. An authorization object 104 can allow complex tests of an authorization under multiple conditions. Authorizations 102 can allow user to execute actions within the system. Authorization object groups can include fields that related by Boolean operators such as AND. One may need several authorizations to perform an operation in a particular application. The authorization 102 is the permission that enables you to perform a particular activity in the application, based on a set of authorization object field values. These authorizations (or permissions) are collected in an authorization profile. A profile is the actual permissions or access rights, identified by an object name and a corresponding authorization name. This profile can then be assigned to a user or a role to give required authorization.

Figure 2:
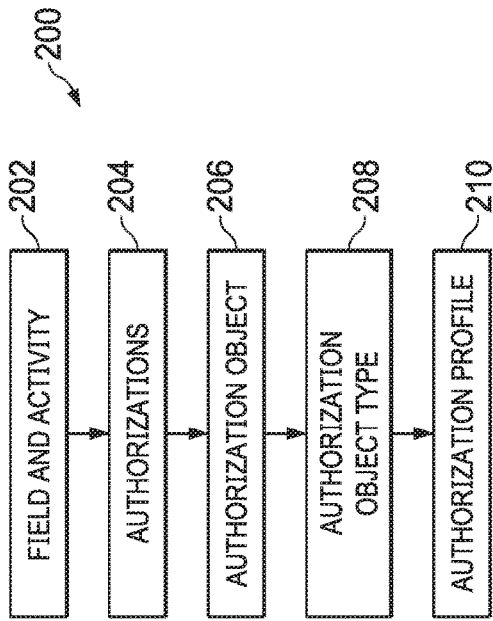
FIG. 2 is a flow diagram of an example of an authorization profile creation process, according to some implementations of the present disclosure.

FIG. 2 is a flow diagram of an example of an authorization profile creation process 200, according to some implementations of the present disclosure. The authorization profile creation flow 200 can provide the structure for a typical authorization in ERP, for example. The field and activity 202 is the smallest unit for which an authorization 204 can be made (and against which an authorization check should be made). The field and activity 202 is a least granular data element on which to secure data. An authorization object 206 can group a number of authorization 204 fields together. The fields can be used to check authorizations and control access at an application level. An authorization object type 208 is a logical grouping of authorization objects 206. Finally, an authorization profile 210 can be used to provide user authorizations based on provided authorizations 204 and authorization objects 206.

Figure 3:
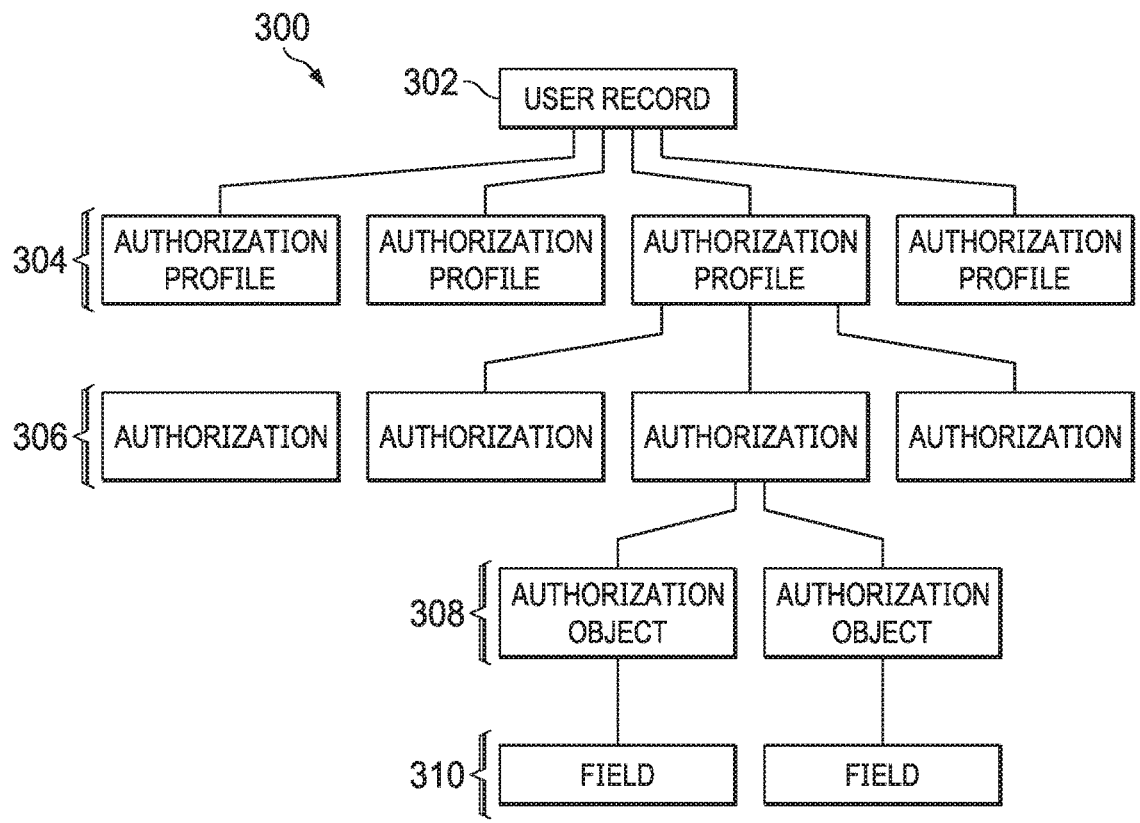
FIG. 3 is a block diagram showing an example of an authorization hierarchy, according to some implementations of the present disclosure.

FIG. 3 is a block diagram showing an example of an authorization hierarchy 300, according to some implementations of the present disclosure. A user record 302 for a user can include one or more authorization profiles 304. Each authorization profile 304 can include multiple authorizations 306. Each authorization 306 can include one or more authorization objects 308, each providing access to a field 310.

Authorizations can be extended to users to perform privileged activities. Authorizations can serve as the key building blocks of ERP access control and security. Authorizations can be used in a process of assigning values to the fields 310 that are present in each authorization object 310. Access to system functionality can be achieved through a complex array of authorizations. For example, if the user lacks the necessary authorizations to perform a certain function in the system, a message (for example, "You are not authorized . . . ") can be displayed.

In some implementations (for example, authorizations performed in conventional systems), during an authorization check for a specific object, the system can evaluate if an authorization object 308 corresponding to the specific object exists in an authorization profile 304 of the user record 302. Upon determining that the object exists in the user profile, fields 310 in the authorization object 308 can be evaluated to determine if the user is allowed to perform an activity or action associated with the object.

In some implementations (for example, authorizations performed in conventional systems), information technology (IT) staff can create roles based on job functions. The roles can then be assigned to users who need to perform their job functions. IT staff can revoke the roles when necessary. For example, IT staff can create a plant manager role, attach necessary permissions, and assign roles to authorized users, such as using the following steps: 1) a role is created for a specific function, 2) authorization fields of authorization objects are set, 3) authorization profiles are generated, 4) profiles are added to roles, and 5) roles are assigned to the user.

Figure 4:
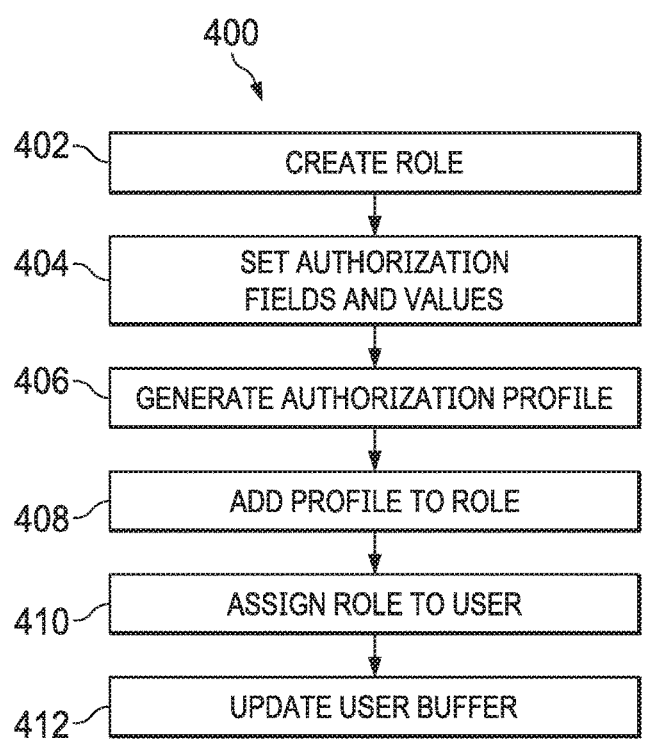
FIG. 4 is a flow diagram of an example of a process for setting authorizations and assigning roles for users, according to some implementations of the present disclosure.

FIG. 4 is a flow diagram of an example of a process 400 for setting authorizations and assigning roles for users, according to some implementations of the present disclosure. For example, process 400 can be used in implementations in which authorizations are performed in conventional systems. In such conventional systems, steps of the process 400 need to be repeated for all resources in the company. At 402, a role is created. At 404, authorization fields and values are set. At 406, an authorization profile is generated. At 408, the authorization profile is added to a role. At 410, the role is assigned to a user. At 412, a user buffer that identifies user roles is updated.

Using the process 400, a variant role can be to be created for each plant, each warehouse, each organization code, and each cost center, for example. When a requirement exists to control access by a specific department (for example, sales vs. HR), a variant of the role can be created for each role to allow for access for such scenario. The need to repeat the process for each variant can lead to an increasing number of roles being created to manage resource authorization effectively. As a result, the system administrator needs to create and maintain potentially thousands of roles, including to provide access in obscure roles. The reliance on system administrators in this way can compromise security requirements associated with the segregation of duties, leading to additional overhead and errors that may occur during the definition and maintenance of user roles. Further, whenever a new resource is added to the computer system, unique security requirements need to be defined. The system administrator not only has to create a new role to represent the unique security requirements for the new resource, but also needs to create a relationship between the new resource and the new role, including potentially creating multiple relationships with existing roles. In practice, the system administrator is unlikely to identify an existing role on which to understand and base the new roll. Instead, the system administrator is likely to add the new role in an ad hoc manner without considering the wider security implications of accommodating the new piece of content.

Variant Profiles

The present disclosure describes variant profile solutions that can be used to address the issues of handling organizational variants for system roles. Variant profile solutions can eliminate the need to develop and maintain thousands of variant roles, which can reduce resource use at different levels of an organization and reduce the number of the roles needed to effectively manage authorizations. Variant profile solutions also provide additional controls not possible in conventional systems, including organization approval, user approval, and proponent approvals. The controls can ensure that requesting access to organizational variants, such cost centers not belonging to a user's organization, will be subjected to the cost center's organizational approval. The variant profile solutions can also be configured to handle the business requirements for each base role for each application.

Figure 5:
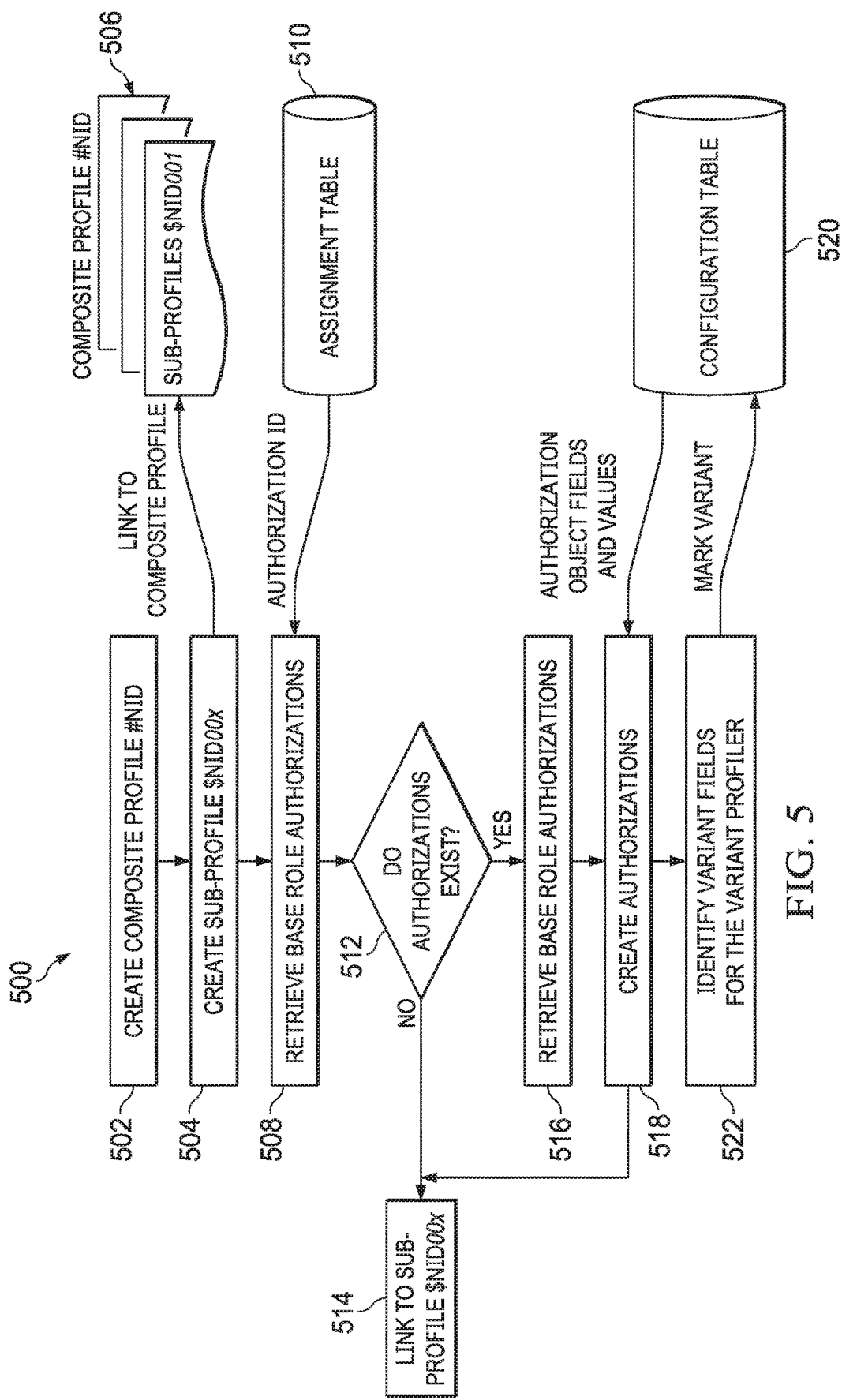
FIG. 5 is a flow diagram of an example of a process for using variant profiles for setting user authorizations, according to some implementations of the present disclosure.

FIG. 5 is a flow diagram of an example of a process 500 for using variant profiles for setting user authorizations, according to some implementations of the present disclosure. The process 500 can use concepts associated with composite/sub-profiles. For example, for each user who requires a variant authorization, a composite profile and a sub-profile for authorizations are created. The user's profile is then updated and the user's buffer is refreshed. The process 500 can be used, for example, after the user's first variant request is approved.

At 502, a composite profile is created, using a format #NID, for example, in which NID is the network ID of the user. At 504, a sub-profile is created, for example, using format &NID00x, in which NID is the network ID of the user and 00x is a sequence number of a sequence starting with 001. At 506, the new sub-profile is linked to the composite profile. In some implementations, system limitations may include a maximum sequence number (for example, 170) for use in linking sub-profiles to profiles. Until the maximum sequence number is reached, for example, the system can system automatically create a new sub-profile by increasing the sequence number by 1 and linking the sub-profile to the composite profile. At 508, the base role authorization is retrieved from an assignment table 510. At 512, the variant authorization assignment table is checked. At 514, if an authorization has already been created for the same base role and variant, then the authorization ID is linked to the sub-profile. At 516, if no authorization has yet been created, then base role authorizations are retrieved. At 518, an instance of the authorization object is created using a configuration table 520. The configuration table 520 contains the authorization object's technical details such as fields and their values, including marking field as the variant field in the configuration. At 522, variant fields for the variant profiler are identified. A variant field can be filled with a request variant, for example. The new authorization is linked to the sub-profile.

Subsequent variant requests from the user will go direct to step 506. Further checks can be done to make sure that number of authorization in the sub-profile does not exceed a threshold (for example, a design maximum of 170). If the maximum is reached, for example, the system can automatically create a new sub-profile by increasing the sequence number by 1 and link the new sub-profile to the composite profile.

FIGS. 6A-6B collectively present a screenshot of an example of a role assignment user interface 600, according to some implementations of the present disclosure. The role assignment user interface 600 can be used when the user submits a request for a variant access, for example. The user network ID (NID) 602 can be ASSIAA0B and the user may need access to a Cost Sheet Reporting function 604 (Role Name 606: FICO:PFAD:08:0000) for a cost center group 608 of 30000058. The user can submit the generic role request using the online service supported by the role assignment user interface 600.

Figure 7:
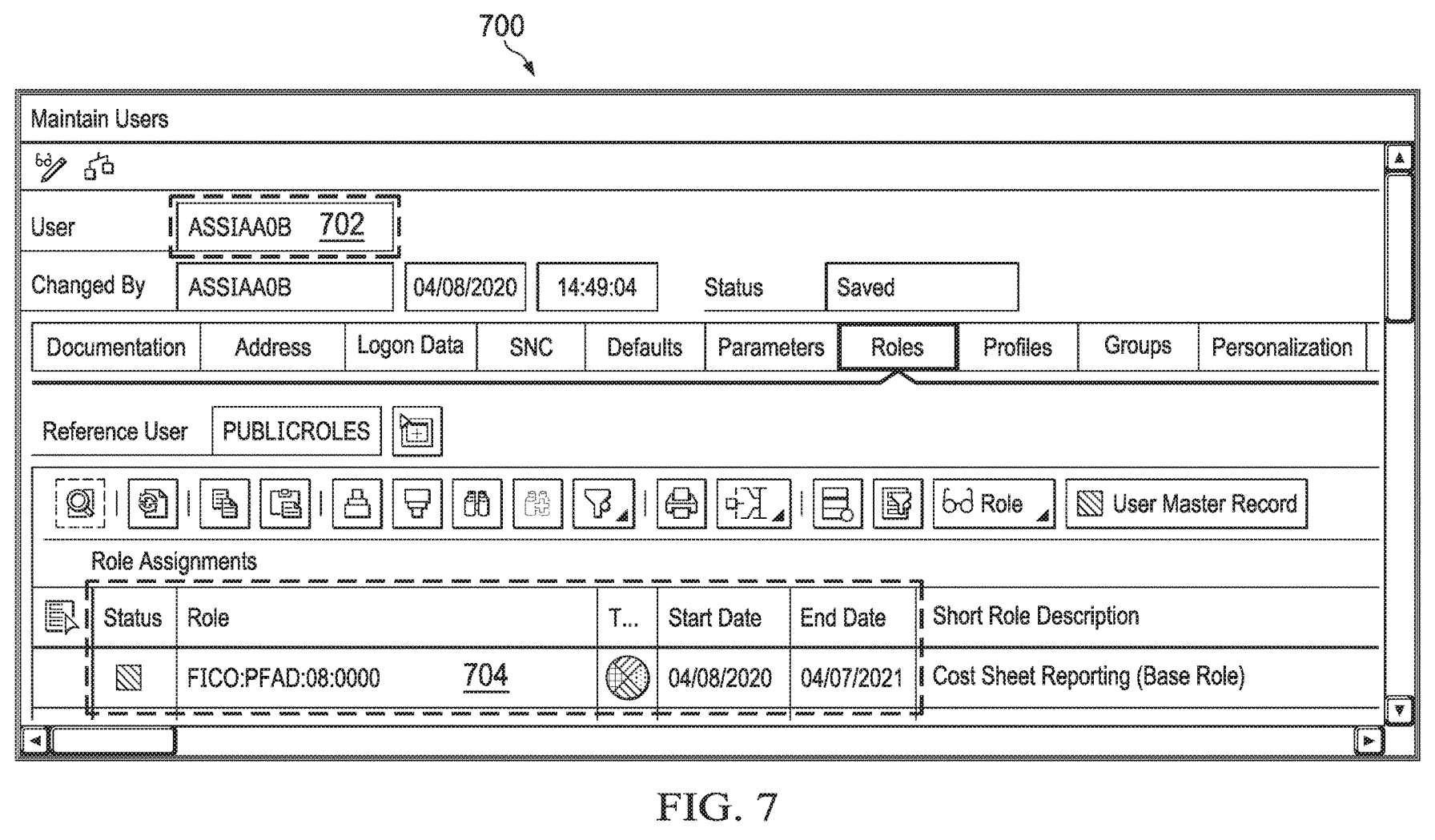

FIG. 7 is a screenshot of an example of a user administration tool 700, according to some implementations of the present disclosure. Once the request is fully approved by the user's management, cost center owner, and the role owner, the system will assign the role to the user. For example, user 702 is assigned role 704.

Figure 8:
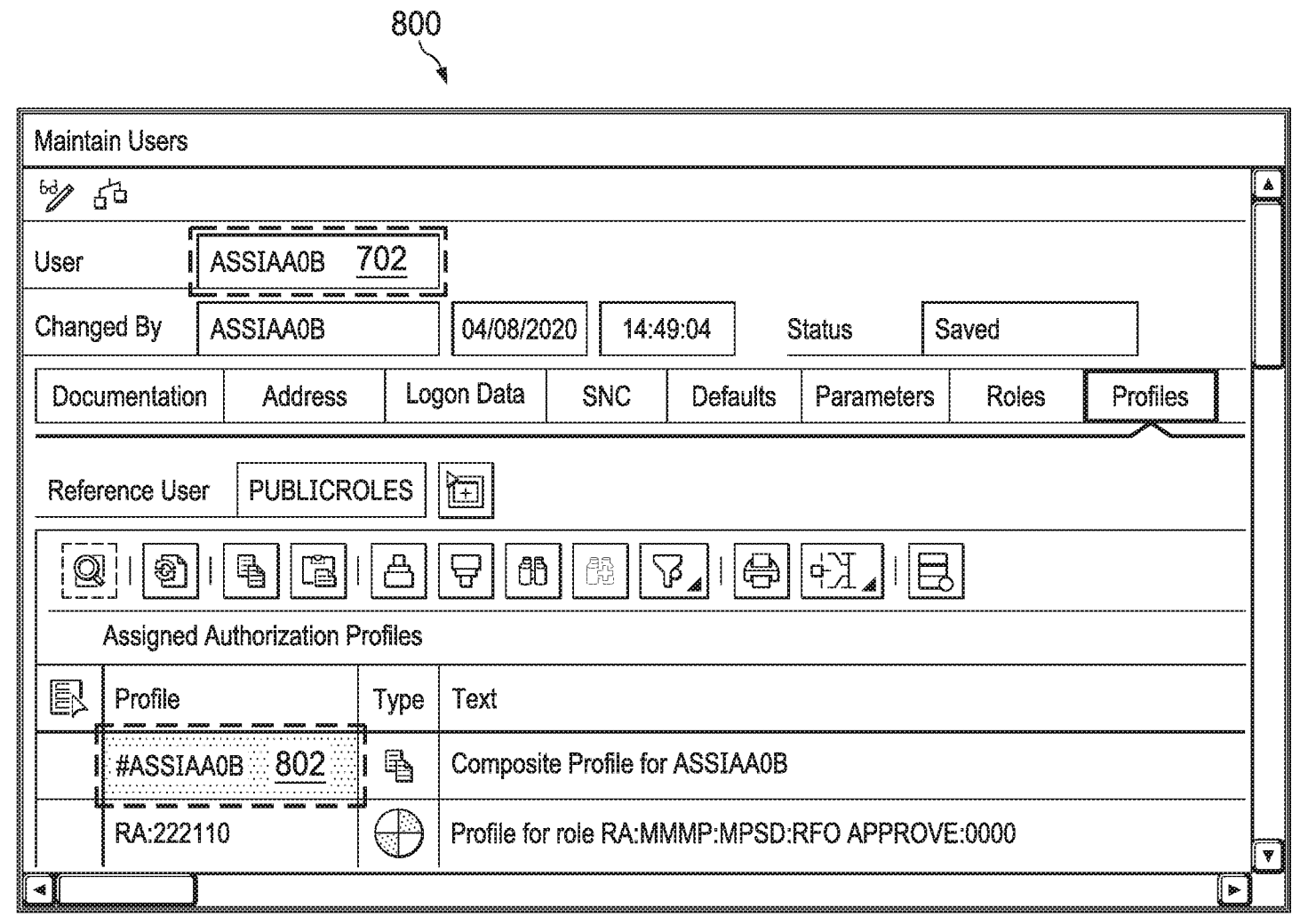

FIG. 8 is a screenshot of an example of an authorization assignment tool 800, according to some implementations of the present disclosure. The authorization assignment tool 800 identifies the user 702. The system can check if the user's composite profile already created. If not, the system will create a new profile 802 with the ID #ASSIAA0B and assign it to the user 702. The system can then create the sub-profile $ASSIAA0B001 and link the sub-profile to the composite profile #ASSIAA0B.

Figure 9:
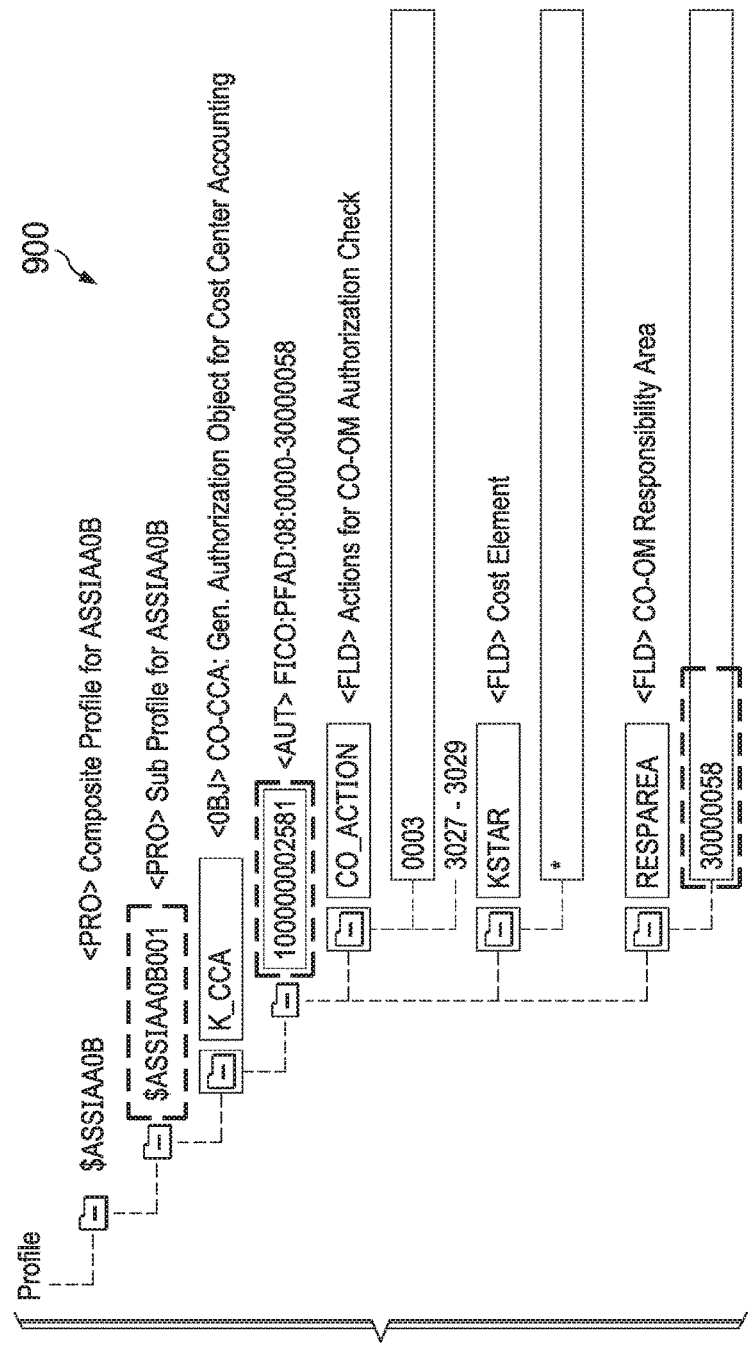
FIG. 9 is a diagram of an example of a profile, according to some implementations of the present disclosure.

FIG. 9 is a diagram of an example of a profile 900, according to some implementations of the present disclosure. The system can check if an authorization has already been created, for example, for a combination of a role FICO:PFAD:08:0000 and a variant 30000058 (corresponding to the cost center group). If the authorization exists, then the authorization can be linked, for example, to a sub-profile $ASSIAA0B001. Otherwise, the authorization object configuration can be accessed for the role. A variant field can be identified to be filled with the requested variant 30000058. A new instance of the authorization object can be created, and the new authorization can be linked, for example, to the sub-profile $ASSIAA0B001.

Figure 10:
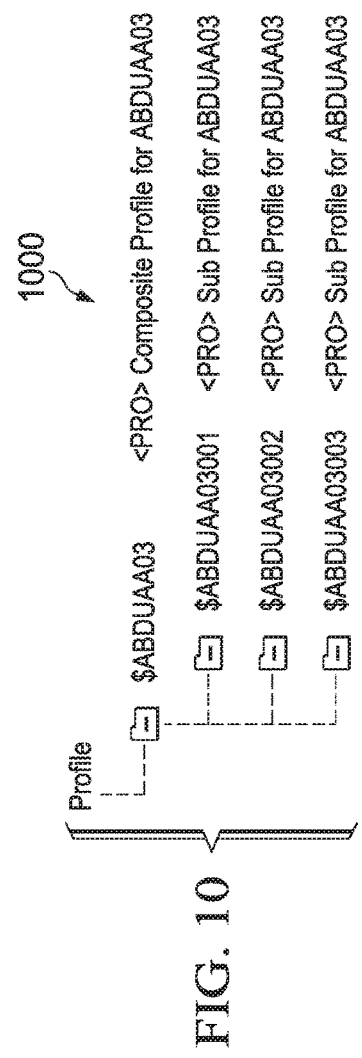
FIG. 10 is a diagram of an example of a composite profile, according to some implementations of the present disclosure.

FIG. 10 is a diagram of an example of a composite profile 1000, according to some implementations of the present disclosure. Each user can have a composite profile, where sub-profiles contain the necessary authorizations for the user. The authorizations can be updated when changes occur in base roles or organizational assignments.

Figure 11:
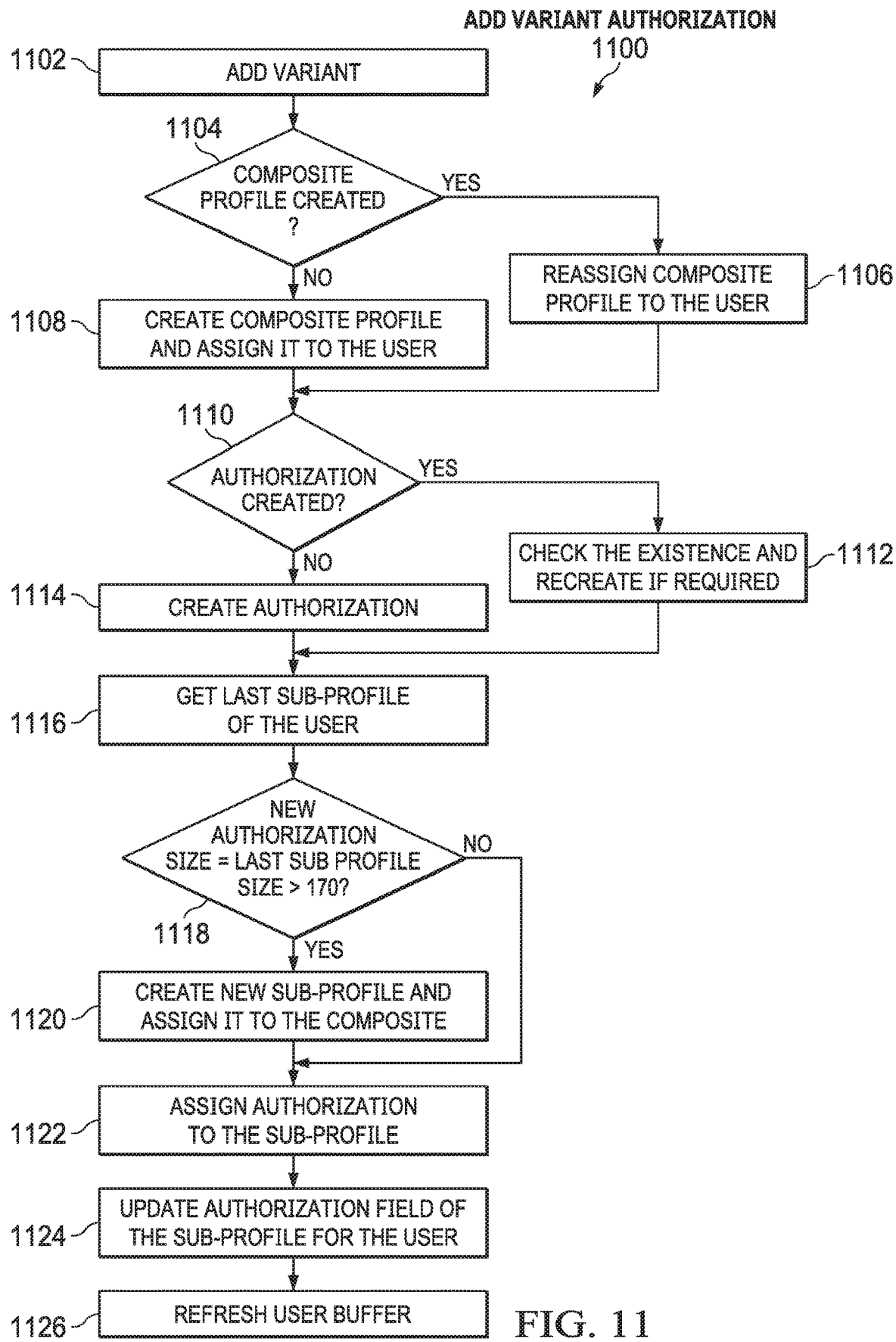
FIG. 11 is a flow diagram showing an example of a process for adding a variant profile based on base roles, according to some implementations of the present disclosure.

FIG. 11 is a flow diagram showing an example of a process 1100 for adding a variant profile based on base roles, according to some implementations of the present disclosure. At 1102, the process for adding a variant starts. At 1104, a determination is made whether a composite profile for the user exists. At 1106, if a composite profile exists for the user, the composite profile is reassigned to the user. At 1108, if a composite profile does not exist for the user, then a new composite profile is created and assigned to the user.

At 1110, a determination is made whether an authorization object exists. At 1112, if the authorization object exists, then the authorization object is checked and re-created if needed. At 1114, if the authorization object does not exist, then the authorization object is created, and the necessary authorizations are assigned to the sub-profile. At 1116, the last sub-profile of the user is accessed, such as to determine if a threshold has been reached. At 1118, a determination is made whether the threshold is exceeded (for example, new authorization size minus last profile size is greater than 170).

At 1120, if the threshold is exceeded, then the new sub-profile is created and assigned (or added) to the composite profile. At 1122, if the threshold is not exceeded (or after the new sub-profile is created and assigned to the composite profile), the authorization is assigned to the sub-profile. At 1124, the authorization field in the sub-profile is updated. At 1126, the user's buffer is refreshed to allow the new authorization to take effect.

Figure 12:
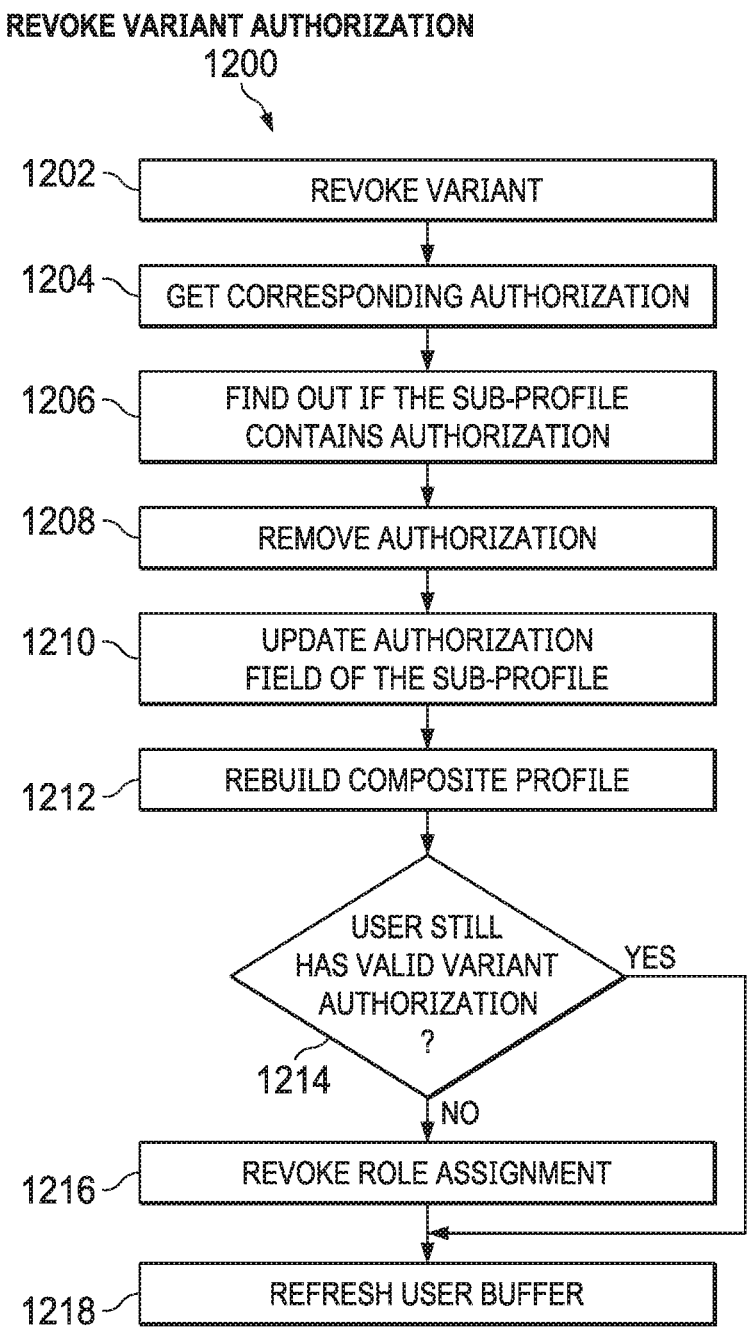
FIG. 12 is a flow diagram showing an example of a process for revoking authorization variants, according to some implementations of the present disclosure.

FIG. 12 is a flow diagram showing an example of a process 1200 for revoking authorization variants, according to some implementations of the present disclosure. The process 1200 can be used, for example, when a specific authorization needs to be removed for a given user. At 1202, the process for revoking an authorization starts. At 1204, explicit authorizations to be removed for the user are identified and accessed. At 1206, specific sub-profiles that have the authorizations in the composite profile are identified. At 1208, the authorization is removed for the user. At 1210, fields related to the authorization are updated. At 1212, the composite authorization profile is rebuilt. At 1214, a determination is made whether valid variant authorizations of the user remain to be revoked. At 1216, if there are more valid profile variant to be revoked for the user, the role assignment is revoked. At 1218, the user buffer is updated to make the revocations effective.

Figure 13:
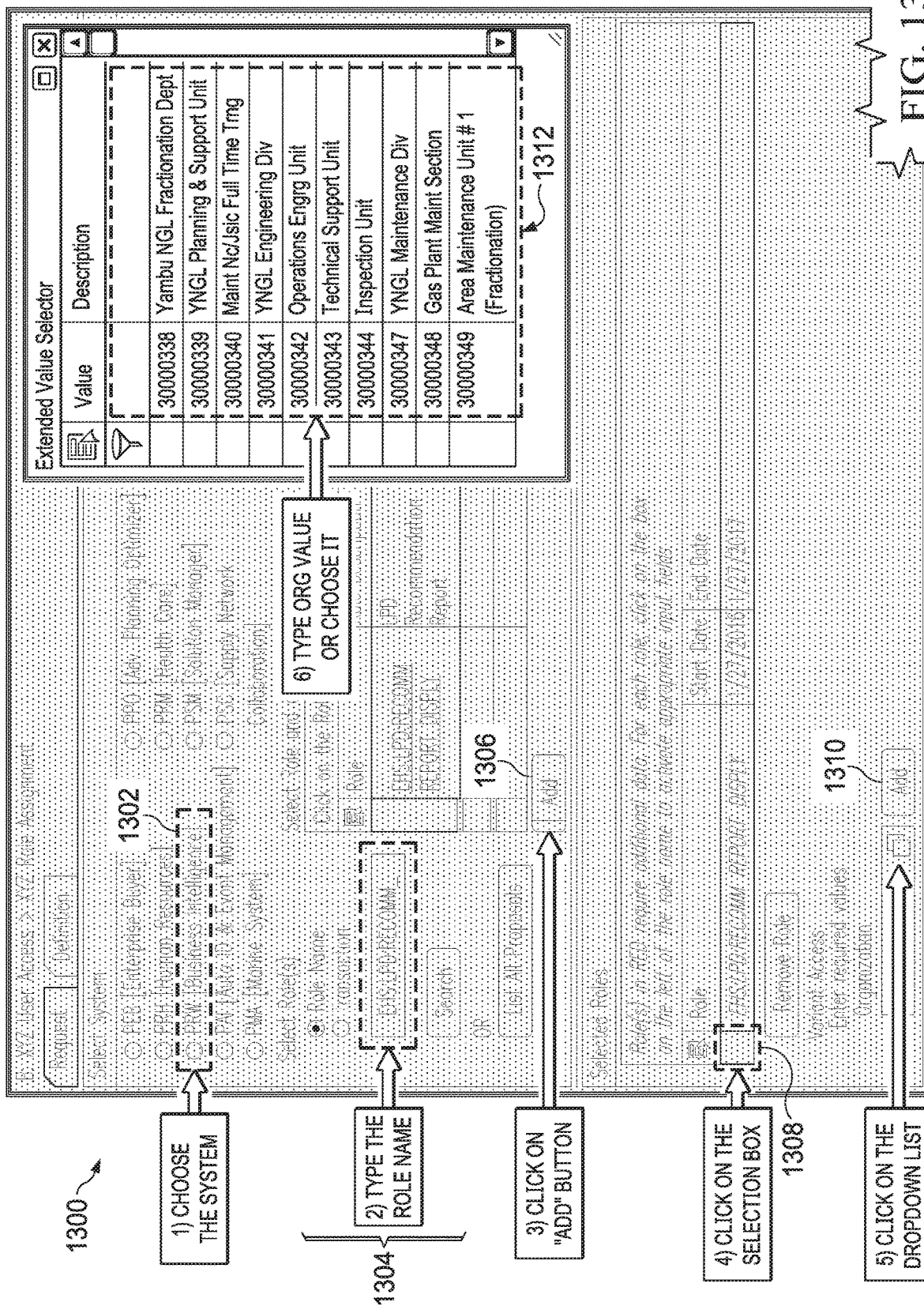
FIG. 13 is a screenshot of an example of a role assignment user interface, according to some implementations of the present disclosure.

FIG. 13 is a screenshot of an example of a role assignment user interface 1300, according to some implementations of the present disclosure. The role assignment user interface 1300 can be used by an end user, for example, to request access to a specific system resource. First, using a system selection control 1302, the user can select the system to be used for role assignment. The user can search for roles within the system using controls 1304 to search by transaction or role name. Once the user has identified the role to be used for role assignment, the user can select on an "Add" button 1306 to add the role to the request. The system can automatically determine if the selected role requires a variant. If so, then the role can be added to the request in a different color (for example, red) and the input field(s) can be displayed prefilled with all variant values from the variant catalog. For example, a control 1308 can be used to select a role needing variant access. A control 1310 can be used to display a drop-down list of extended values. The user can select from values 1312 to be added to the request. Once the user has submitted the request, the system can generate a user management workflow task and other entity workflows as required.

Figure 14:
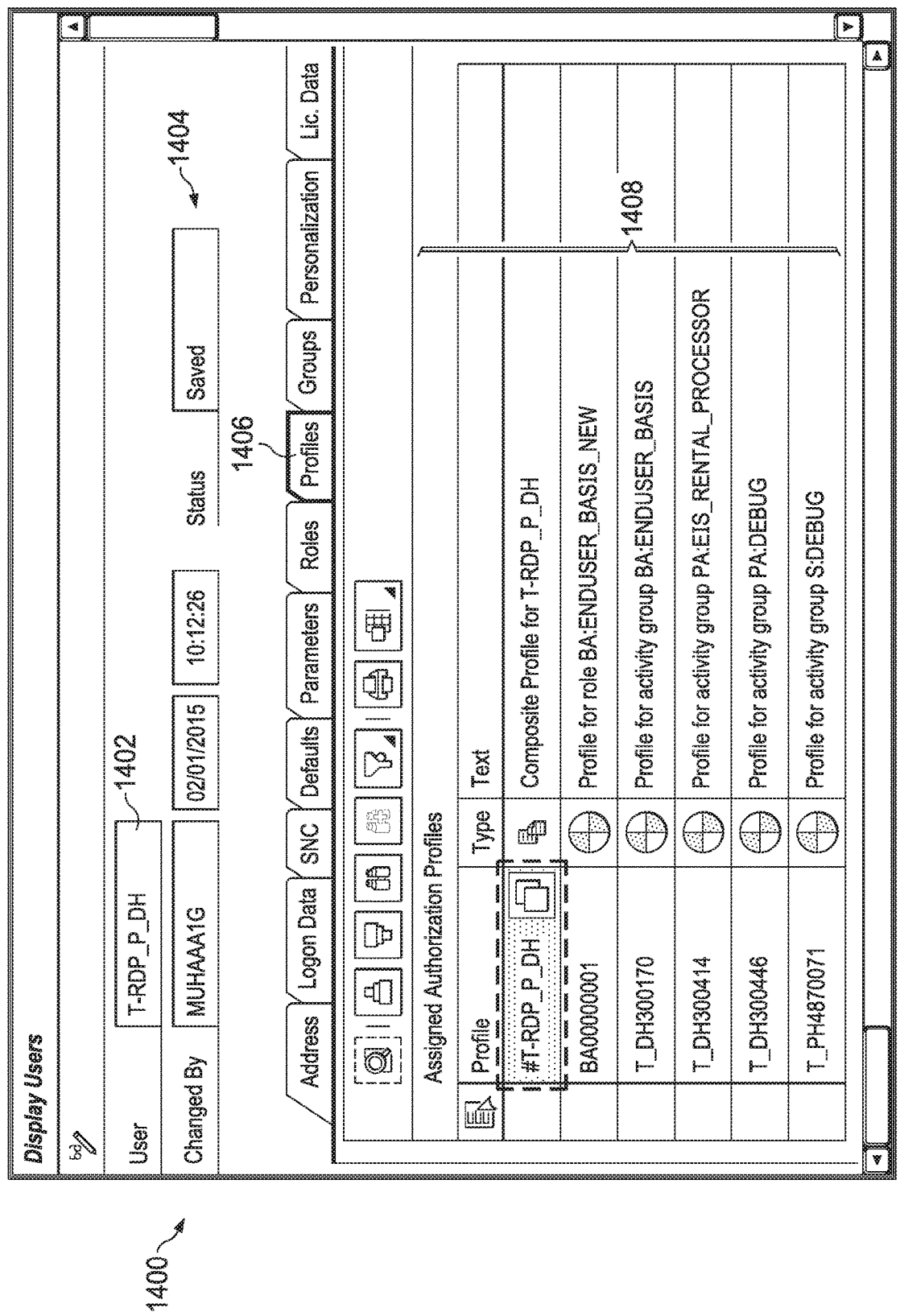
FIG. 14 is a screen shot of an example of a display-users user interface for displaying assigned authorization profiles for a particular user, according to some implementations of the present disclosure.

FIG. 14 is a screen shot of an example of a display-users user interface 1400 for displaying assigned authorization profiles for a particular user, according to some implementations of the present disclosure. For example, a user field 1402 identifies the selected user for which the assigned authorization profiles are displayed. Change history and status information 1404 provides information about who last changed the authorizations and the status result. A profiles tab 1406 can be used to display assigned authorization profiles 1408 for the user. The display-users user interface 1400 shows that the user 1402 with a user network ID is T-RDP_P_DH and a composite profile #T-RDP_P_DH is assigned to the user under the profiles tab 1406.

Figures 15, 16:
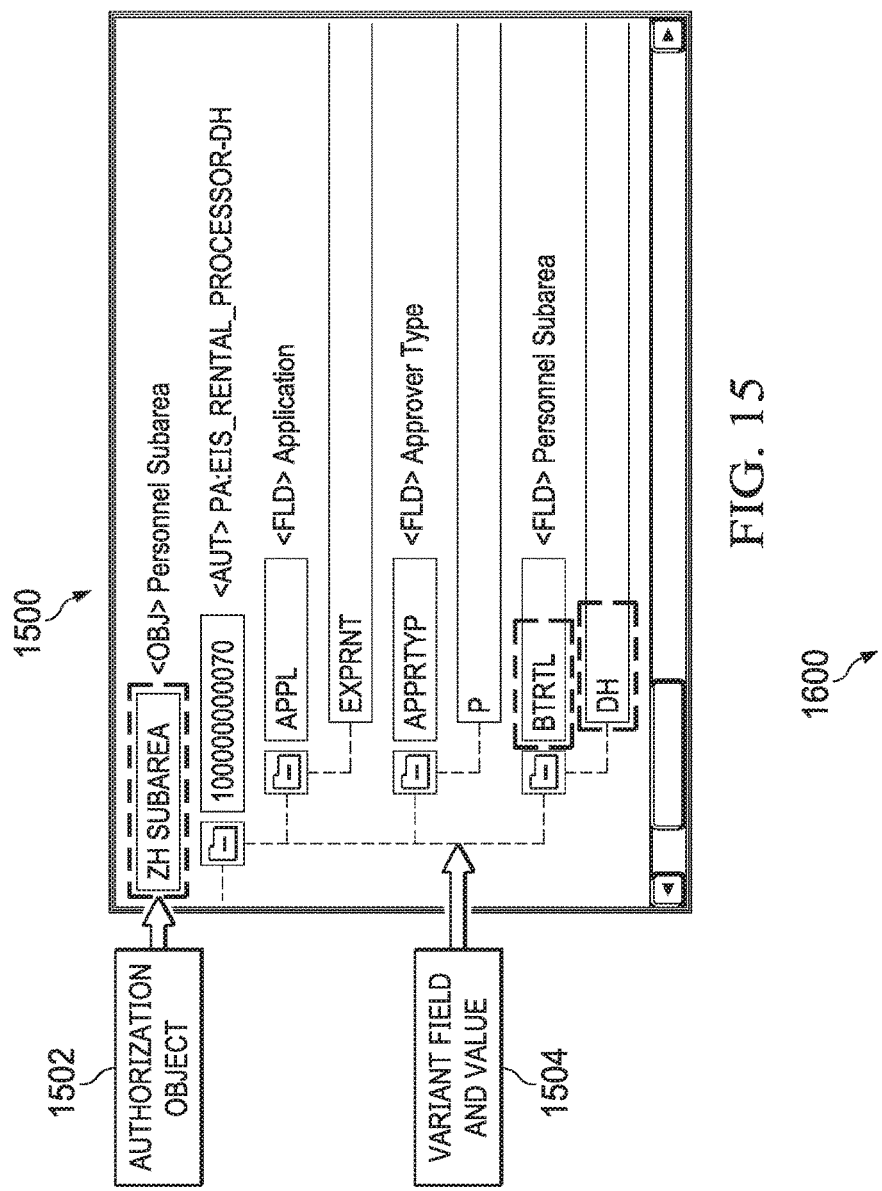
FIG. 15 is a diagram of an example of a hierarchical relationship between an authorization object and variant fields and values, according to some implementations of the present disclosure.
FIG. 16 is a diagram of an example of a base role variant object and variant field table, according to some implementations of the present disclosure.

FIG. 15 is a diagram of an example of a hierarchical relationship 1500 between an authorization object 1502 and variant fields and values 1504, according to some implementations of the present disclosure. The hierarchical relationship 1500 shows the authorization object configuration and how the variant field is flagged, for example. In this example, the authorization that is created is based on the configuration, where the variant field "BTRTL" is filled with a requested variant value "DH."

FIG. 16 is a diagram of an example of a base role variant object and variant field table 1600, according to some implementations of the present disclosure. The table can be presented in various instances of the user interfaces previously described, for example. The table 1600 shows an authorization object configuration and how the variant field is flagged.

Figure 17:
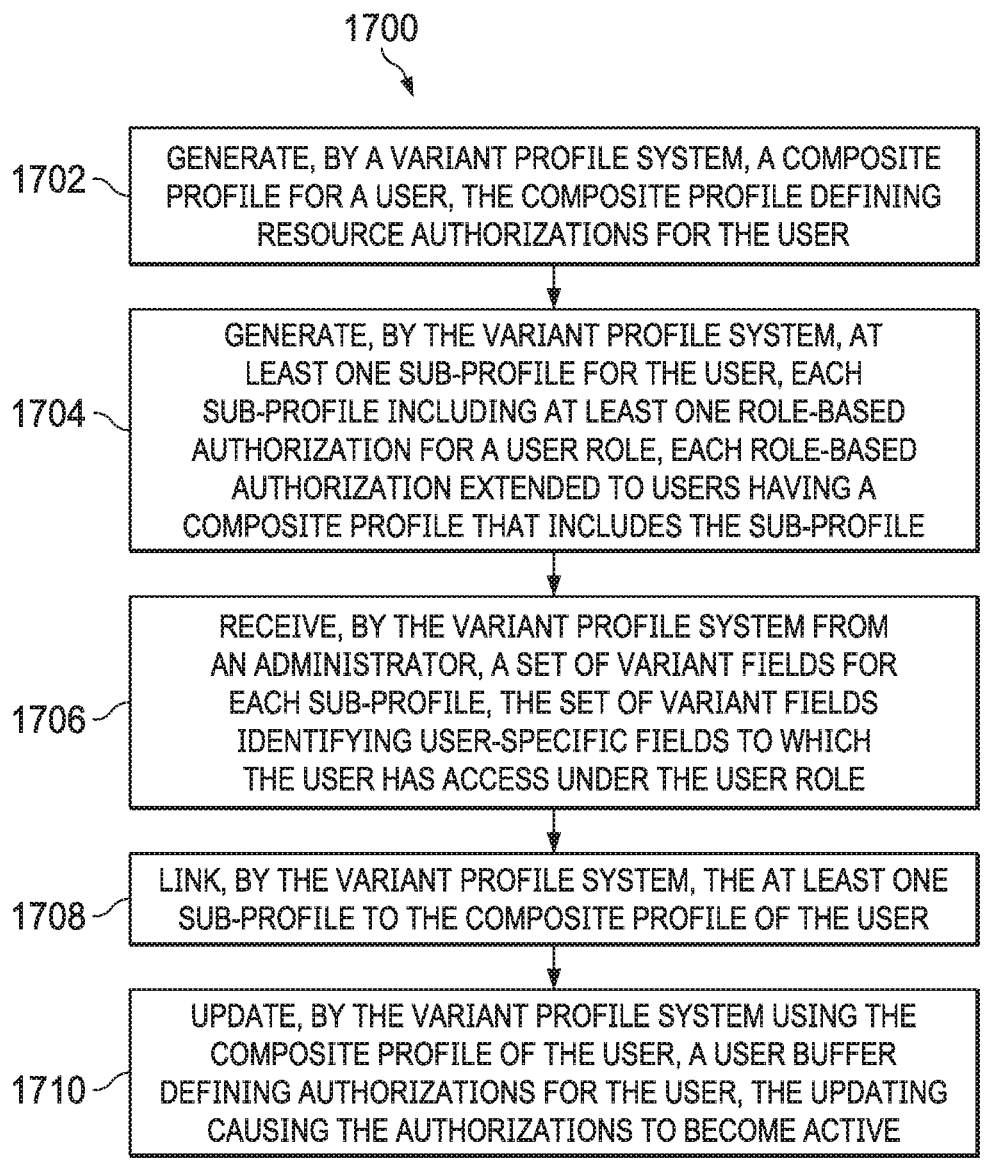
FIG. 17 is a flowchart of an example method for providing user authorizations using variant profiles, according to some implementations of the present disclosure.

FIG. 17 is a flowchart of an example method 1700 for providing user authorizations using variant profiles, according to some implementations of the present disclosure. For clarity of presentation, the description that follows generally describes method 1700 in the context of the other figures in this description. However, it will be understood that method 1700 can be performed, for example, by any suitable system, environment, software, or hardware, or a combination of systems, environments, software, and hardware, as appropriate. In some implementations, various steps of method 1700 can be run in parallel, in combination, in loops, or in any order.

At 1702, a composite profile for a user is generated by a variant profile system. The composite profile defines resource authorizations for the user. For example, a composite profile can be generated as described with reference to step 1108 of the process 1100. From 1702, method 1700 proceeds to 1704.

At 1704, at least one sub-profile is generated by the variant profile system for the user. Each sub-profile includes at least one role-based authorization for a user role. Each role-based authorization is extended to users who have a composite profile that includes the sub-profile. For example, an authorization can be generated as described with reference to step 1114 of the process 1100. From 1704, method 1700 proceeds to 1706.

At 1706, a set of variant fields for each sub-profile is received by the variant profile system from an administrator. The set of variant fields identifies user-specific fields to which the user has access under the user role. Each variant field can be defined by an authorization object type that is dynamically assigned based on resources authorizations. Authorization object types can include, for example, a cost center type (different types for different cost centers) and a plant type (different types for different plants). Each resource authorization can be defined by a resource code, including the at least one cost center code and plant code. From 1706, method 1700 proceeds to 1708.

At 1708, the at least one sub-profile is linked by the variant profile system to the composite profile of the user. For example, linking can occur in step 1124 of the process 1100. From 1708, method 1700 proceeds to 1710.

At 1710, a user buffer defining authorizations for the user is updated by the variant profile system using the composite profile of the user, causing the authorizations to become active. For example, refreshing the user buffer can occur in step 1126 of the process 1100. After 1710, method 1700 can stop.

In some implementations, method 1700 can further include accessing the user buffer by the variant profile system to provide user access to data, for example, by checking authorizations at run-time. For example, the user access can be limited by the role-based authorizations and the set of variant fields defined for each role-based authorization in the composite profile of the user.

In some implementations, method 1700 can further include steps for updating variant fields accessible for a given sub-profile of a user. For example, the variant profile system can receive administrator inputs changing the set of variant fields for a given sub-profile. The variant profile system can update the composite profile of the user. The variant profile system can refresh the user buffer using the composite profile of the user, causing changes in the composite profile to become active. In some implementations, the process 1100 can be used for updating variant fields accessible for a given sub-profile of a user.

In some implementations, method 1700 can further include steps for revoking a role-based authorization for a user. For example, the variant profile system can receive administrator inputs to revoke a role-based authorization for the user. The variant profile system can update the composite profile of the user to remove the role-based authorization. The variant profile system can refresh the user buffer to cause changes in the composite profile to become active. In some implementations, the process 1200 can be used for revoking authorization variant.

Figure 18:
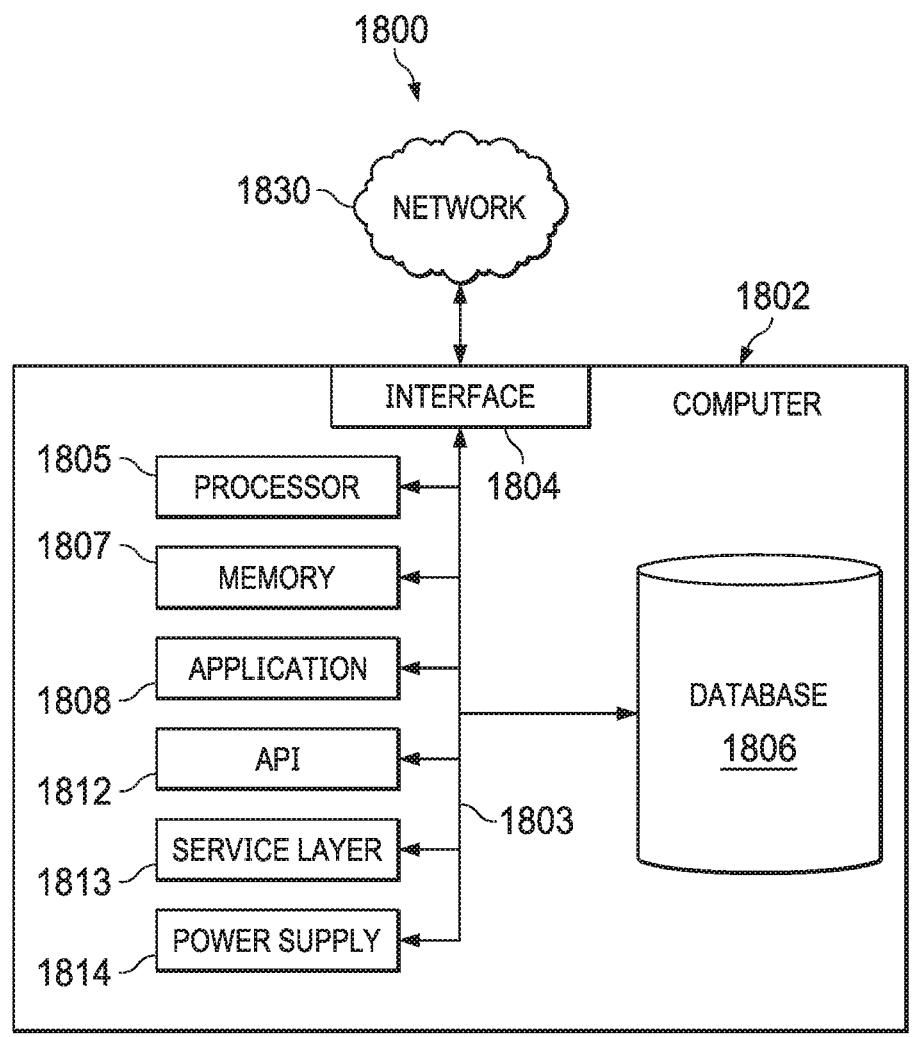
FIG. 18 is a block diagram illustrating an example computer system used to provide computational functionalities associated with described algorithms, methods, functions, processes, flows, and procedures as described in the present disclosure, according to some implementations of the present disclosure.

FIG. 18 is a block diagram of an example computer system 1800 used to provide computational functionalities associated with described algorithms, methods, functions, processes, flows, and procedures described in the present disclosure, according to some implementations of the present disclosure. The illustrated computer 1802 is intended to encompass any computing device such as a server, a desktop computer, a laptop/notebook computer, a wireless data port, a smartphone, a personal data assistant (PDA), a tablet computing device, or one or more processors within these devices, including physical instances, virtual instances, or both. The computer 1802 can include input devices such as keypads, keyboards, and touchscreens that can accept user information. Also, the computer 1802 can include output devices that can convey information associated with the operation of the computer 1802. The information can include digital data, visual data, audio information, or a combination of information. The information can be presented in a graphical user interface (UI, or GUI).

The computer 1802 can serve in a role as a client, a network component, a server, a database, a persistency, or components of a computer system for performing the subject matter described in the present disclosure. The illustrated computer 1802 is communicably coupled with a network 1830. In some implementations, one or more components of the computer 1802 can be configured to operate within different environments, including cloud-computing-based environments, local environments, global environments, and combinations of environments.

At a high level, the computer 1802 is an electronic computing device operable to receive, transmit, process, store, and manage data and information associated with the described subject matter. According to some implementations, the computer 1802 can also include, or be communicably coupled with, an application server, an email server, a web server, a caching server, a streaming data server, or a combination of servers.

The computer 1802 can receive requests over network 1830 from a client application (for example, executing on another computer 1802). The computer 1802 can respond to the received requests by processing the received requests using software applications. Requests can also be sent to the computer 1802 from internal users (for example, a command console), external (or third) parties, automated applications, entities, individuals, systems, and computers.

Each of the components of the computer 1802 can communicate using a system bus 1803. In some implementations, any or all of the components of the computer 1802, including hardware or software components, can interface with each other or the interface 1804 (or a combination of both), over the system bus 1803. Interfaces can use an application programming interface (API) 1812, a service layer 1813, or a combination of the API 1812 and service layer 1813. The API 1812 can include specifications for routines, data structures, and object classes. The API 1812 can be either computer-language independent or dependent. The API 1812 can refer to a complete interface, a single function, or a set of APIs.

The service layer 1813 can provide software services to the computer 1802 and other components (whether illustrated or not) that are communicably coupled to the computer 1802. The functionality of the computer 1802 can be accessible for all service consumers using this service layer. Software services, such as those provided by the service layer 1813, can provide reusable, defined functionalities through a defined interface. For example, the interface can be software written in JAVA, C++, or a language providing data in extensible markup language (XML) format. While illustrated as an integrated component of the computer 1802, in alternative implementations, the API 1812 or the service layer 1813 can be stand-alone components in relation to other components of the computer 1802 and other components communicably coupled to the computer 1802. Moreover, any or all parts of the API 1812 or the service layer 1813 can be implemented as child or sub-modules of another software module, enterprise application, or hardware module without departing from the scope of the present disclosure.

The computer 1802 includes an interface 1804. Although illustrated as a single interface 1804 in FIG. 18, two or more interfaces 1804 can be used according to particular needs, desires, or particular implementations of the computer 1802 and the described functionality. The interface 1804 can be used by the computer 1802 for communicating with other systems that are connected to the network 1830 (whether illustrated or not) in a distributed environment. Generally, the interface 1804 can include, or be implemented using, logic encoded in software or hardware (or a combination of software and hardware) operable to communicate with the network 1830. More specifically, the interface 1804 can include software supporting one or more communication protocols associated with communications. As such, the network 1830 or the interface's hardware can be operable to communicate physical signals within and outside of the illustrated computer 1802.

The computer 1802 includes a processor 1805. Although illustrated as a single processor 1805 in FIG. 18, two or more processors 1805 can be used according to particular needs, desires, or particular implementations of the computer 1802 and the described functionality. Generally, the processor 1805 can execute instructions and can manipulate data to perform the operations of the computer 1802, including operations using algorithms, methods, functions, processes, flows, and procedures as described in the present disclosure.

The computer 1802 also includes a database 1806 that can hold data for the computer 1802 and other components connected to the network 1830 (whether illustrated or not). For example, database 1806 can be an in-memory, conventional, or a database storing data consistent with the present disclosure. In some implementations, database 1806 can be a combination of two or more different database types (for example, hybrid in-memory and conventional databases) according to particular needs, desires, or particular implementations of the computer 1802 and the described functionality. Although illustrated as a single database 1806 in FIG. 18, two or more databases (of the same, different, or combination of types) can be used according to particular needs, desires, or particular implementations of the computer 1802 and the described functionality. While database 1806 is illustrated as an internal component of the computer 1802, in alternative implementations, database 1806 can be external to the computer 1802.

The computer 1802 also includes a memory 1807 that can hold data for the computer 1802 or a combination of components connected to the network 1830 (whether illustrated or not). Memory 1807 can store any data consistent with the present disclosure. In some implementations, memory 1807 can be a combination of two or more different types of memory (for example, a combination of semiconductor and magnetic storage) according to particular needs, desires, or particular implementations of the computer 1802 and the described functionality. Although illustrated as a single memory 1807 in FIG. 18, two or more memories 1807 (of the same, different, or combination of types) can be used according to particular needs, desires, or particular implementations of the computer 1802 and the described functionality. While memory 1807 is illustrated as an internal component of the computer 1802, in alternative implementations, memory 1807 can be external to the computer 1802.

The application 1808 can be an algorithmic software engine providing functionality according to particular needs, desires, or particular implementations of the computer 1802 and the described functionality. For example, application 1808 can serve as one or more components, modules, or applications. Further, although illustrated as a single application 1808, the application 1808 can be implemented as multiple applications 1808 on the computer 1802. In addition, although illustrated as internal to the computer 1802, in alternative implementations, the application 1808 can be external to the computer 1802.

The computer 1802 can also include a power supply 1814. The power supply 1814 can include a rechargeable or non-rechargeable battery that can be configured to be either user- or non-user-replaceable. In some implementations, the power supply 1814 can include power-conversion and management circuits, including recharging, standby, and power management functionalities. In some implementations, the power-supply 1814 can include a power plug to allow the computer 1802 to be plugged into a wall socket or a power source to, for example, power the computer 1802 or recharge a rechargeable battery.

There can be any number of computers 1802 associated with, or external to, a computer system containing computer 1802, with each computer 1802 communicating over network 1830. Further, the terms "client," "user," and other appropriate terminology can be used interchangeably, as appropriate, without departing from the scope of the present disclosure. Moreover, the present disclosure contemplates that many users can use one computer 1802 and one user can use multiple computers 1802.

Described implementations of the subject matter can include one or more features, alone or in combination.

For example, in a first implementation, a computer-implemented method includes the following. A composite profile for a user is generated by a variant profile system. The composite profile defines resource authorizations for the user. At least one sub-profile is generated by the variant profile system for the user. Each sub-profile includes at least one role-based authorization for a user role, and each role-based authorization is extended to users having a composite profile that includes the sub-profile. A set of variant fields for each sub-profile is received by the variant profile system from an administrator. The set of variant fields identifies user-specific fields to which the user has access under the user role. The at least one sub-profile is linked by the variant profile system to the composite profile of the user. A user buffer defining authorizations for the user is updated by the variant profile system using the composite profile of the user, causing the authorizations to become active.

The foregoing and other described implementations can each, optionally, include one or more of the following features:

A first feature, combinable with any of the following features, where each variant field is defined by an authorization object type that is dynamically assigned based on resources authorizations.

A second feature, combinable with any of the previous or following features, where authorization object types include a cost center type and a plant type.

A third feature, combinable with any of the previous or following features, where each resource authorization is defined by a resource code including at least one of a cost center code and a plant code.

A fourth feature, combinable with any of the previous or following features, the method further including accessing the user buffer by the variant profile system to provide user access to data, the user access limited by the role-based authorizations and the set of variant fields defined for each role-based authorization in the composite profile of the user.

A fifth feature, combinable with any of the previous or following features, the method further including: receiving, by the variant profile system, administrator inputs changing the set of variant fields for a given sub-profile; updating, by the variant profile system, the composite profile of the user; and refreshing, by the variant profile system using the composite profile of the user, the user buffer to cause changes in the composite profile to become active.

A sixth feature, combinable with any of the previous or following features, the method further including: receiving, by the variant profile system, administrator inputs to revoke a role-based authorization for the user; updating, by the variant profile system, the composite profile of the user to remove the role-based authorization; and refreshing, by the variant profile system, the user buffer to cause changes in the composite profile to become active.

In a second implementation, a non-transitory, computer-readable medium storing one or more instructions executable by a computer system to perform operations including the following. A composite profile for a user is generated by a variant profile system. The composite profile defines resource authorizations for the user. At least one sub-profile is generated by the variant profile system for the user. Each sub-profile includes at least one role-based authorization for a user role, and each role-based authorization is extended to users having a composite profile that includes the sub-profile. A set of variant fields for each sub-profile is received by the variant profile system from an administrator. The set of variant fields identifies user-specific fields to which the user has access under the user role. The at least one sub-profile is linked by the variant profile system to the composite profile of the user. A user buffer defining authorizations for the user is updated by the variant profile system using the composite profile of the user, causing the authorizations to become active.

The foregoing and other described implementations can each, optionally, include one or more of the following features:

A first feature, combinable with any of the following features, where each variant field is defined by an authorization object type that is dynamically assigned based on resources authorizations.

A second feature, combinable with any of the previous or following features, where authorization object types include a cost center type and a plant type.

A third feature, combinable with any of the previous or following features, where each resource authorization is defined by a resource code including at least one of a cost center code and a plant code.

A fourth feature, combinable with any of the previous or following features, the operations further including accessing the user buffer by the variant profile system to provide user access to data, the user access limited by the role-based authorizations and the set of variant fields defined for each role-based authorization in the composite profile of the user.

A fifth feature, combinable with any of the previous or following features, the operations further including: receiving, by the variant profile system, administrator inputs changing the set of variant fields for a given sub-profile; updating, by the variant profile system, the composite profile of the user; and refreshing, by the variant profile system using the composite profile of the user, the user buffer to cause changes in the composite profile to become active.

A sixth feature, combinable with any of the previous or following features, the operations further including: receiving, by the variant profile system, administrator inputs to revoke a role-based authorization for the user; updating, by the variant profile system, the composite profile of the user to remove the role-based authorization; and refreshing, by the variant profile system, the user buffer to cause changes in the composite profile to become active.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. A composite profile for a user is generated by a variant profile system. The composite profile defines resource authorizations for the user. At least one sub-profile is generated by the variant profile system for the user. Each sub-profile includes at least one role-based authorization for a user role, and each role-based authorization is extended to users having a composite profile that includes the sub-profile. A set of variant fields for each sub-profile is received by the variant profile system from an administrator. The set of variant fields identifies user-specific fields to which the user has access under the user role. The at least one sub-profile is linked by the variant profile system to the composite profile of the user. A user buffer defining authorizations for the user is updated by the variant profile system using the composite profile of the user, causing the authorizations to become active.

The foregoing and other described implementations can each, optionally, include one or more of the following features:

A first feature, combinable with any of the following features, where each variant field is defined by an authorization object type that is dynamically assigned based on resources authorizations.

A second feature, combinable with any of the previous or following features, where authorization object types include a cost center type and a plant type.

A third feature, combinable with any of the previous or following features, where each resource authorization is defined by a resource code including at least one of a cost center code and a plant code.

A fourth feature, combinable with any of the previous or following features, the operations further including accessing the user buffer by the variant profile system to provide user access to data, the user access limited by the role-based authorizations and the set of variant fields defined for each role-based authorization in the composite profile of the user.

A fifth feature, combinable with any of the previous or following features, the operations further including: receiving, by the variant profile system, administrator inputs changing the set of variant fields for a given sub-profile; updating, by the variant profile system, the composite profile of the user; and refreshing, by the variant profile system using the composite profile of the user, the user buffer to cause changes in the composite profile to become active.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    generating, by a variant profile system, a composite profile for a user, the composite profile defining resource authorizations for the user;
    generating, by the variant profile system, at least one sub-profile for the user, each sub-profile including at least one role-based authorization for a user role, each role-based authorization extended to users having a composite profile that includes the sub-profile;
    receiving, by the variant profile system from an administrator, a set of variant fields for each sub-profile, the set of variant fields identifying user-specific fields to which the user has access under the user role;
    linking, by the variant profile system, the user-specific fields accessible by the user under the user role and the at least one sub-profile to the composite profile of the user, wherein access to each user-specific field is controlled by an authorization object, wherein linking includes:
        determining whether the authorization object exists; and
        in response to determining that the authorization object does not exist, creating the authorization object providing user authorization for the user to access the user-specific fields, wherein the user authorization is based at least on the at least one sub-profile and the composite profile of the user; and
    updating, by the variant profile system using the composite profile of the user, a user buffer defining authorizations for the user, the updating causing the authorizations to become active.

2. The computer-implemented method of claim 1, wherein each variant field is defined by an authorization object type that is dynamically assigned based on resources authorizations.

3. The computer-implemented method of claim 2, wherein authorization object types include a cost center type and a plant type.

4. The computer-implemented method of claim 2, wherein each resource authorization is defined by a resource code including at least one of a cost center code and a plant code.

5. The computer-implemented method of claim 1, further comprising accessing the user buffer by the variant profile system to provide user access to data, the user access limited by the role-based authorizations and the set of variant fields defined for each role-based authorization in the composite profile of the user.

6. The computer-implemented method of claim 1, further comprising:
    receiving, by the variant profile system, administrator inputs changing the set of variant fields for a given sub-profile;
    updating, by the variant profile system, the composite profile of the user; and
    refreshing, by the variant profile system using the composite profile of the user, the user buffer to cause changes in the composite profile to become active.

7. The computer-implemented method of claim 1, further comprising:
    receiving, by the variant profile system, administrator inputs to revoke a role-based authorization for the user;
    updating, by the variant profile system, the composite profile of the user to remove the role-based authorization; and
    refreshing, by the variant profile system, the user buffer to cause changes in the composite profile to become active.

8. A non-transitory, computer-readable medium storing one or more instructions executable by a computer system to perform operations comprising:
    generating, by a variant profile system, a composite profile for a user, the composite profile defining resource authorizations for the user;
    generating, by the variant profile system, at least one sub-profile for the user, each sub-profile including at least one role-based authorization for a user role, each role-based authorization extended to users having a composite profile that includes the sub-profile;
    receiving, by the variant profile system from an administrator, a set of variant fields for each sub-profile, the set of variant fields identifying user-specific fields to which the user has access under the user role;
    linking, by the variant profile system, the user-specific fields accessible by the user under the user role and the at least one sub-profile to the composite profile of the user, wherein access to each user-specific field is controlled by an authorization object, wherein linking includes:
        determining whether the authorization object exists; and
        in response to determining that the authorization object does not exist, creating the authorization object providing user authorization for the user to access the user-specific fields, wherein the user authorization is based at least on the at least one sub-profile and the composite profile of the user; and
    updating, by the variant profile system using the composite profile of the user, a user buffer defining authorizations for the user, the updating causing the authorizations to become active.

9. The non-transitory, computer-readable medium of claim 8, wherein each variant field is defined by an authorization object type that is dynamically assigned based on resources authorizations.

10. The non-transitory, computer-readable medium of claim 9, wherein authorization object types include a cost center type and a plant type.

11. The non-transitory, computer-readable medium of claim 9, wherein each resource authorization is defined by a resource code including at least one of a cost center code and a plant code.

12. The non-transitory, computer-readable medium of claim 8, the operations further comprising accessing the user buffer by the variant profile system to provide user access to data, the user access limited by the role-based authorizations and the set of variant fields defined for each role-based authorization in the composite profile of the user.

13. The non-transitory, computer-readable medium of claim 8, the operations further comprising:
    receiving, by the variant profile system, administrator inputs changing the set of variant fields for a given sub-profile;
    updating, by the variant profile system, the composite profile of the user; and
    refreshing, by the variant profile system using the composite profile of the user, the user buffer to cause changes in the composite profile to become active.

14. The non-transitory, computer-readable medium of claim 8, the operations further comprising:
    receiving, by the variant profile system, administrator inputs to revoke a role-based authorization for the user;
    updating, by the variant profile system, the composite profile of the user to remove the role-based authorization; and
    refreshing, by the variant profile system, the user buffer to cause changes in the composite profile to become active.

15. A computer-implemented system, comprising:
    one or more processors; and
    a non-transitory computer-readable storage medium coupled to the one or more processors and storing programming instructions for execution by the one or more processors, the programming instructions instructing the one or more processors to perform operations comprising:
        generating, by a variant profile system, a composite profile for a user, the composite profile defining resource authorizations for the user;
        generating, by the variant profile system, at least one sub-profile for the user, each sub-profile including at least one role-based authorization for a user role, each role-based authorization extended to users having a composite profile that includes the sub-profile;
        receiving, by the variant profile system from an administrator, a set of variant fields for each sub-profile, the set of variant fields identifying user-specific fields to which the user has access under the user role;
        linking, by the variant profile system, the user-specific fields accessible by the user under the user role and the at least one sub-profile to the composite profile of the user, wherein access to each user-specific field is controlled by an authorization object, wherein linking includes:
            determining whether the authorization object exists; and
            in response to determining that the authorization object does not exist, creating the authorization object providing user authorization for the user to access the user-specific fields, wherein the user authorization is based at least on the at least one sub-profile and the composite profile of the user; and
        updating, by the variant profile system using the composite profile of the user, a user buffer defining authorizations for the user, the updating causing the authorizations to become active.

16. The computer-implemented system of claim 15, wherein each variant field is defined by an authorization object type that is dynamically assigned based on resources authorizations.

17. The computer-implemented system of claim 16, wherein authorization object types include a cost center type and a plant type.

18. The computer-implemented system of claim 16, wherein each resource authorization is defined by a resource code including at least one of a cost center code and a plant code.

19. The computer-implemented system of claim 15, the operations further comprising accessing the user buffer by the variant profile system to provide user access to data, the user access limited by the role-based authorizations and the set of variant fields defined for each role-based authorization in the composite profile of the user.

20. The computer-implemented system of claim 15, the operations further comprising:
    receiving, by the variant profile system, administrator inputs changing the set of variant fields for a given sub-profile;
    updating, by the variant profile system, the composite profile of the user; and
    refreshing, by the variant profile system using the composite profile of the user, the user buffer to cause changes in the composite profile to become active.

* * * * *